US006963996B2

(12) United States Patent
Coughlin (10) Patent No.: US 6,963,996 B2
(45) Date of Patent: Nov. 8, 2005

(54) SESSION ERROR RECOVERY (75) Inventor: Chesley B. Coughlin, San Diego, CA (US)

(73) Assignee: Intel Corporation, Santa Clara, CA (US)

(*) Notice: Subject to any disclaimer, the term of this patent is extended or adjusted under 35 U.S.C. 154(b) by 492 days.

(21) Appl. No.: 10/135,622

(22) Filed: Apr. 30, 2002

(65) Prior Publication Data

US 2003/0204769 A1 Oct. 30, 2003

(51) Int. Cl.[7] ............................................. G06F 11/00
(52) U.S. Cl. .............................. 714/4; 714/10; 714/11; 709/208
(58) Field of Search ......................... 714/4, 10, 11, 15; 709/208

(56) References Cited

U.S. PATENT DOCUMENTS

| | | | | |
|---|---|---|---|---|
| 5,951,694 A | * | 9/1999 | Choquier et al. ............. 714/15 |
| 6,145,090 A | * | 11/2000 | Yamaguchi et al. ........... 714/4 |
| 6,185,695 B1 | * | 2/2001 | Murphy et al. ................ 714/4 |
| 6,292,905 B1 | * | 9/2001 | Wallach et al. ................ 714/4 |
| 2003/0014526 A1 | * | 1/2003 | Pullara et al. ............... 709/227 |
| 2003/0159083 A1 | * | 8/2003 | Fukuhara et al. ............. 714/11 |

OTHER PUBLICATIONS

Intel Corporation, User Guide for the Intel NetStructure 7180 e-Commerce Directors and the Intel NetStructure 7140/7170 Traffic Directors, 2000, Intel. San Diego, California, United States of America.

* cited by examiner

Primary Examiner—Nadeem Iqbal
Assistant Examiner—Yolanda L Wilson
(74) Attorney, Agent, or Firm—Buckley, Maschoff & Talwalkar LLC (57) ABSTRACT A method, apparatus, and system for restoring communications between network nodes. According to some embodiments, a request from a client device to a primary server device may be received at a session integrity proxy and stored. When an error associated with the primary server device is detected, it may be arranged for information associated with the request to be re-played to a secondary server device.

28 Claims, 3 Drawing Sheets

SESSION ERROR RECOVERY

BACKGROUND OF THE INVENTION

In computer networks, including for example the World Wide Web, interactions occur between user processors or "clients" that desire to conduct transactions and provider processors or "servers" through which the client interacts. A typical interaction may require a client and a server to communicate data back and forth between the client and server numerous times to complete the interaction. When a server fails prior to completion of an interaction, current networks require that the client establish a communication link with another server and begin data communication over from the beginning. Thus, there may be a need for a system, apparatus, and method by which interactions may be restored upon server failure such that data communications between a client and server need not be repeated when such a failure occurs.

BRIEF DESCRIPTION OF THE DRAWINGS

The subject matter regarded as embodiments of the invention is particularly pointed out and distinctly claimed in the concluding portion of the specification. Embodiments of the invention, however, both as to organization and method of operation, together with objects, features, and advantages thereof, may best be understood by reference to the following detailed description wherein like reference numerals are employed to designate like parts or steps, when read with the accompanying drawings in which:

DETAILED DESCRIPTION OF THE INVENTION

Reference will now be made in detail to the preferred embodiments of the present invention, examples of which are illustrated in the accompanying drawings. It is to be understood that the Figures and descriptions of embodiments of the present invention included herein illustrate and describe elements that are of particular relevance, while eliminating, for purposes of clarity, other elements found in typical computers and computer networks.

The present session integrity proxy provides solutions to the shortcomings of transactions performed on networks. Those of ordinary skill in the art will readily appreciate that the invention, while described in connection with World Wide Web applications, is equally applicable to any network including, for example, the Internet or a wide area network. Other details, features, and advantages of the session integrity proxy will become further apparent in the following detailed description of the embodiments.

Any reference in the specification to "one embodiment," "a certain embodiment," or a similar reference to an embodiment is intended to indicate that a particular feature, structure or characteristic described in connection with the embodiment is included in at least one embodiment of the invention. The appearances of such terms in various places in the specification are not necessarily all referring to the same embodiment.

In the present embodiment, a "web server" is a network node that may include a processor or a computer coupled to the World Wide Web and that communicates with other processors on the World Wide Web via a Hypertext Transfer Protocol (HTTP) application (e.g., Apache™ HTTP Server) or an application server (e.g., SendMail™). A "web client" is a network node that may include a processor having a browser (e.g., Microsoft® Internet Explorer™ or Netscape®) or another client application (e.g., Microsoft® Outlook®) that communicates with a web server. A "session integrity proxy" is an application that may be executed on a network node that may include a processor, the processor executing the session integrity proxy application also being called a session integrity proxy, that manages traffic between a web client and a web server. A "session" consists of one or more communications via, for example, serial communication between a web client and a web server. A connection contains one or more requests with a corresponding response between a web client and a web server. A node refers to any processor coupled to the network including web clients, web servers and session integrity proxies.

The Internet is a network of computers, dumb terminals, or other, typically processor-based, devices interconnected by one or more forms of communication media. Typical interconnected devices range from handheld computers and notebook PCs to high-end mainframe and supercomputers. Web clients and web servers are examples of types of devices that are interconnected to the Internet. The communication media coupling those devices include twisted pair, co-axial cable, optical fibers and wireless communication methods such as use of radio frequencies.

Network nodes may be equipped with the appropriate hardware, software or firmware necessary to communicate information in accordance with one or more protocols. A protocol may comprise a set of instructions by which the information signals are communicated over the communications medium. Protocols are, furthermore, often layered over one another to form something called a "protocol stack." In one embodiment of the invention, the network nodes operate in accordance with a packet switching protocol referred to as the Transmission Control Protocol (TCP) as defined by the Internet Engineering Task Force (IETF) standard 7, Request For Comment (RFC) 793, adopted in September, 1981 ("TCP Specification"), and the Internet Protocol (IP) as defined by the IETF standard 5, RFC 791 ("IP Specification"), adopted in September, 1981, both available from "www.ietf.org" (collectively referred to as the "TCP/IP Specification").

An end user device connected to the Internet or the World Wide Web, such as a web client, typically includes a program, such as a browser, that communicates between applications operating on the web client and the TCP/IP protocol stack. TCP packages data into packets that typically include the address of the node from which the packet originates, the size of the packet where applicable, and the address of the destination node to which the packet is to be delivered, such as a web server. Because data is usually sent in multiple packets, the packets also typically include a label indicating the order in which they are to be assembled once they arrive at their destination. After the packets are created, the IP layer transmits the packets across a network such as the Internet.

World Wide Web communication involves another protocol referred to as the Hypertext Transfer Protocol (HTTP) that permits the transfer of Hypertext Markup Language (HTML) documents between computers. HTTP is defined by the Internet Engineering Task Force (IETF) standard 1.1, Request for Comment (RFC) 2068, adopted January, 1997. HTML is defined by the IETF standard 4.0, RFC 3236, adopted January, 2002. Both the HTTP specification and the HTML specification are available from "www.ieff.org".

The HTML documents are often referred to as "web pages" and are files containing information in the form of text, videos, images, links to other web pages, and so forth. Each web page is stored in an interconnected processor based device that is typically referred to as a "web server," and has a unique address referred to as a Universal Resource Locator (URL). The URL is used by a program referred to as a "web browser" located on one interconnected computer to find a web page stored somewhere on another computer connected to the network. That creates a "web" of computers each storing a number of web pages that can be accessed and transferred using a standard protocol, and hence this web of computers is referred to as the World Wide Web.

The World Wide Web and the Internet may be viewed as wide area networks that interconnect many local area networks. At the highest level, the Internet is made up of Network Access Points ("NAPs") interconnected to one another by many alternate routes and interconnected to lower level Metropolitan Area Exchanges ("MAEs"), typically at speeds of 45 to 622 Mbps. The MAEs are, in-turn, interconnected to Internet Service Providers ("ISP's") at speeds of, for example, 45 Mbps. Internet users, such as businesses and personal users are then interconnected to ISP's through various media including dedicated lines leased from telephone companies, switched telephone lines, coaxial cable access leased from cable television companies, and through wireless connections.

Nodes may operate as source nodes, destination nodes, intermediate nodes or a combination of those source nodes, destination nodes, and intermediate nodes. Information is passed from source nodes to destination nodes, often through one or more intermediate nodes. Information may comprise any data capable of being represented as a signal, such as an electrical signal, optical signal, acoustical signal and so forth. Examples of information in this context may include data from a voice conversation, videoconference, streaming video, electronic mail ("email") message, voice mail message, graphics, image, video, text and so forth.

The Internet consists of thousands of networks and hundreds of thousands of interconnections between those networks. Just like a system of roads and highways, there are many different paths by which to get from one point to another. Those many paths are the source of the Internet's resilience and robustness because if one path becomes unavailable there are many other paths to take its place, allowing data to reach its destination even while one or more interconnection on the network is broken. Thus, for example, a web provider may maintain multiple web servers so that if a web server is overtaxed or fails, or if a communication path to a particular web server is overtaxed or fails, another web server may serve web clients.

When communication between a web client and a web server fails, whether due to failure of the web client or communication with that web server, any information transferred or created during one or more web client sessions is lost because current systems are not able to replicate the transmissions made by the web client or the web server. Therefore, when communication with a web server fails, each web client exchanging information with that web server must connect to another web server and begin the session over to complete the desired interaction. For example, if a shopper desires to purchase three items from an on-line vendor, the shopper may access various web pages through the on-line vendor's web server to select the desired items. To complete the transaction, the shopper would typically select the desired items and then enter payment and shipping information to complete the session. If, however, the web server interacting with the shopper fails anytime prior to entry of the payment and shipping information, then all data exchanged during the session is lost. The shopper must then connect to another web server having the on-line vendor's merchandise and carry out the entire session once again.

Thus, current networks do not have the ability to save data passed from a web client to a web server during a session. Current networks also do not have the ability to save data passed from a web server to a web client during a session. Current networks furthermore do not have the ability to restore a session upon failure of a web server. In addition, current networks do not have the ability to restore a session without modifying a web server or web client.

The present session integrity proxy, therefore, checks for a server error and recovers a session after such an error by re-effecting one or more client requests and/or web server responses through a secondary web server upon failure of a primary web server.

When a web server fails, any information transferred or created during a session is lost because the data transferred by the web client is not stored and the data transferred by the web server is not stored. An embodiment includes a method of saving or recording data transferred by a web client and/or data transferred by a web server. Another embodiment includes a method of replicating data transferred by the web server and data transferred by the web client to restore a session automatically.

The session integrity proxy may be implemented in a system. In one embodiment, that system comprises a network having a client processor coupled to a network, a primary server processor coupled to the network, a secondary server processor coupled to the network, and a session integrity proxy processor coupled to the network. The session integrity proxy processor of that system has memory and instructions. When the instructions are executed by the processor, the processor stores a request sent from the client processor to the primary server processor in the memory, detects an error at the primary server processor, transmits the request sent from the client processor to the primary server processor to the secondary server processor, and transmits a response sent from the secondary server processor to the client processor.

Figure 1:
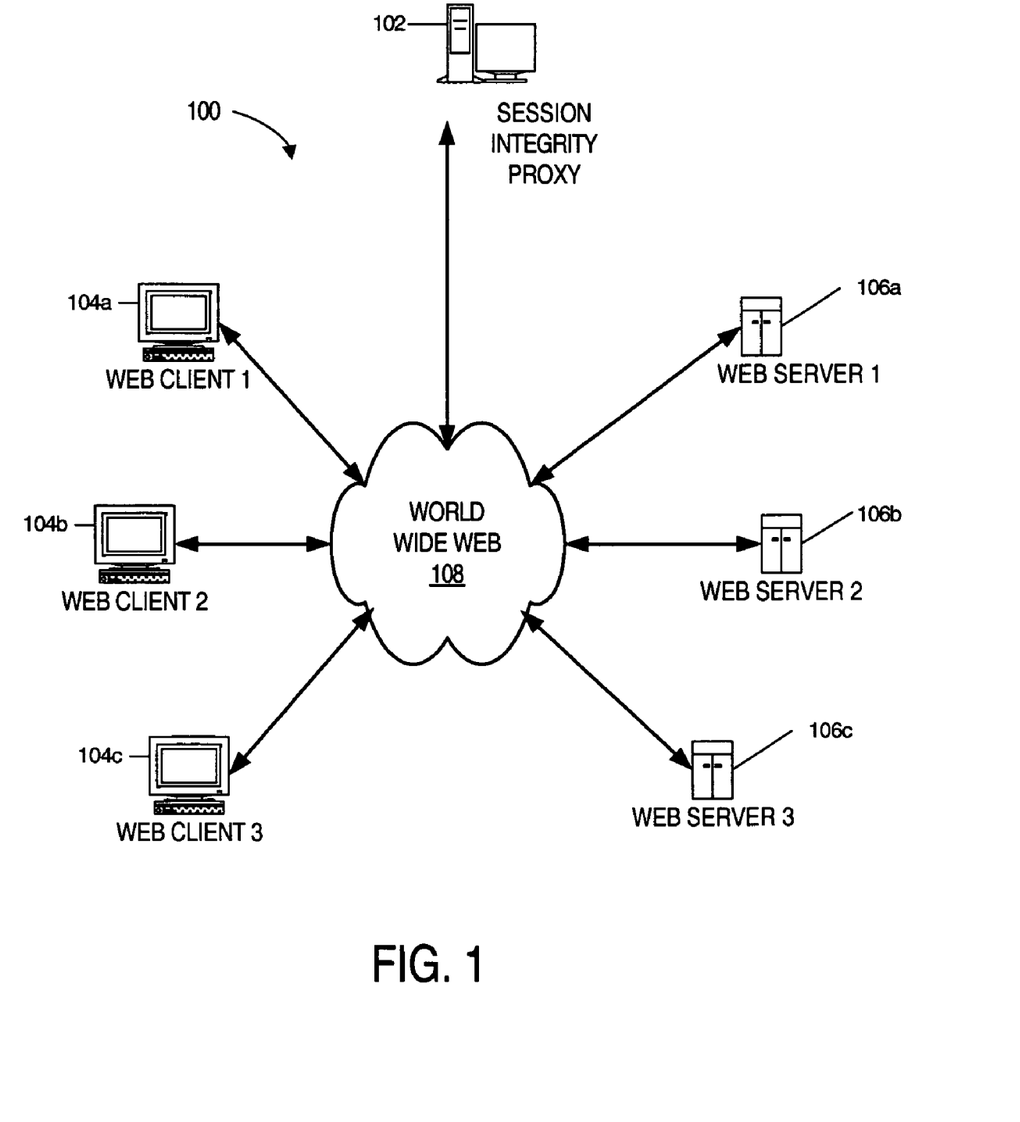
FIG. 1 is a block diagram of a system suitable for practicing an embodiment of the invention.

FIG. 1 illustrates an embodiment of a session integrity proxy system 100 that automatically restores a session after failure of that session. The illustrated embodiment includes a plurality of web clients 104a, 104b and 104c communicating with a plurality of web servers 106a, 106b and 106c over the World Wide Web 108. A session integrity proxy 102 is also communicating with one or more of the plurality of web clients 104a, 104b and 104c and one or more of the web servers 106a, 106b and 106c over the World Wide Web 108. Although the session integrity proxy system 100 illustrates only three web clients 104a, 104b and 104c, three web servers 106a, 106b and 106c, and one session integrity proxy 102 for conciseness, it should be appreciated that any number of web clients 104a, 104b and 104c, web servers 106a, 106b and 106c, and session integrity proxies 102 may be implemented as part of session integrity proxy system 100 and still fall within the scope of the present invention.

When a web client 104 interfaces with a web server 106, the session integrity proxy 102 records requests sent by the web client 104 and/or responses sent by the web server 106.

Request transmissions from the web client 104 may be routed in a variety of ways such that they are received by the web server 106 and recorded at the session integrity proxy 102. For example, a request may pass from the web client 104 to the session integrity proxy 102 and then be routed from the session integrity proxy 102 to the web server 106. Alternately, the request may be routed to the web server 106 and the session integrity proxy 102 in parallel when those requests are to be recorded and the responses may be routed to the web client 104 and the session integrity proxy 102 in parallel when those responses are to be recorded.

When a failure is detected at the web server 106, the session integrity proxy 102 will restore some or all of the requests and responses recorded during the session to another web server 106. For example, assume that a web client 104*a* is communicating with a primary web server 106*a* in search of a newspaper article that requires penetration to a fourth level menu for retrieval. The web client 104*a* has penetrated three levels when the session integrity proxy 102 detects a failure of web server 106*a*. The session integrity proxy 102 transmits the first request sent from the web client 104*a* to the primary web server 106*a* to the secondary web server 106*b*, which contains the same data as web server 106*a*. The secondary web server 106*b* responds to the session integrity proxy 102, which does not transmit the response to the web client 104*a*, but rather transmits the second saved request to the secondary web server 106*b*. Upon receipt of the response to the second request, the session integrity proxy 102 sends the third request to the secondary web server 106*b*. The session integrity proxy 102 recognizes that it contains no further requests from that session and transmits the response received from the secondary web server 106*b* to the web client 104*a*. The web client 104*a* has thereby been automatically returned to the state at which the primary web server 106*a* failed.

It should be noted that, depending on the connectivity of the system (e.g., serial versus parallel connection to the session integrity proxy 102) and the desire of the user, retransmissions by the session integrity proxy 102 may be echoed on the web client 104, may be performed transparently to the web client 104, or may be performed with minimal notification to the web client 104 of the web server 106 failure and restoration of the session on another web server 106.

Thus, as quickly as the requests can be transmitted to the secondary web server 106*b*, processed by the secondary web server 106, and responses can be returned from the secondary web server 106, the session integrity proxy 102 can replicate the session on the secondary web server 106*b* and provide the web client 104*a* with the next appropriate response, which in the preceding example, would be access to the third level, which was requested prior to failure of web server 106*a*.

When configured as a device separate from the web client 104 or web server 106, an embodiment of the session integrity proxy 102 includes memory and a processor communicating with the memory. The processor contains instructions which, when executed by the processor, cause the processor to store a request sent from a client processor to a primary server processor in the memory, detect an error at the primary server processor, transmit the request sent from the client processor to the primary server processor to a secondary server processor, and transmit a response sent from the secondary server processor to the client processor.

When configured as a device separate from the web client 104 or web server 106, another embodiment of the session integrity proxy 102 that also performs web server load balancing includes memory and a processor communicating with the memory. That processor also contains instructions which, when executed by the processor, cause the processor to store a request sent from a client processor in the memory, transmit the request to a primary server processor, detect an error at the primary server processor, transmit the request sent from the client processor to a secondary server processor, and transmit a response sent from the secondary server processor to the client processor.

Figure 2:
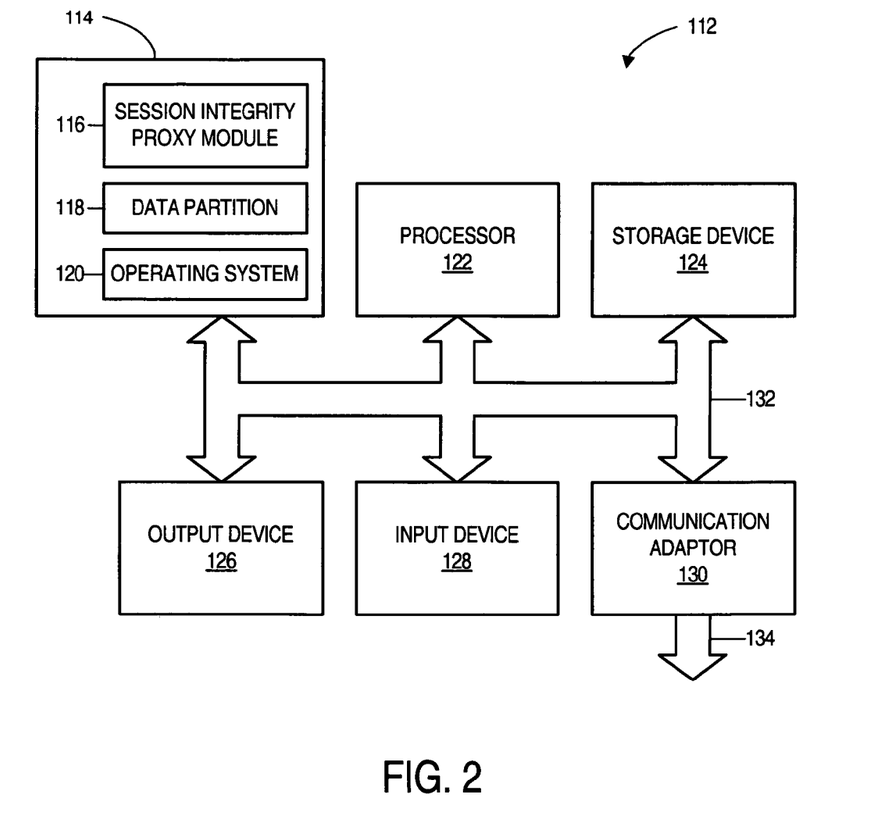
FIG. 2 is a block diagram of a system integrity proxy suitable for practicing an embodiment of the invention.

FIG. 2 illustrates a session integrity proxy device 112 that performs the session integrity proxy function in one embodiment in which the session integrity proxy operates in a device separate from the web client 104 and web server 106. The session integrity proxy device 112 includes memory 114, a processor 122, a storage device 124, an output device 126, an input device 128, and a communication adaptor 130. Communication between the processor 122, the storage device 124, the output device 126, the input device 128, and the communication adaptor 130 is accomplished by way of a communication bus 132.

The memory 114 may, for example, include random access memory (RAM), dynamic RAM, and/or read only memory (ROM) (e.g., programmable ROM, erasable programmable ROM, or electronically erasable programmable ROM) and may store computer program instructions and information. The memory may furthermore be partitioned into sections in which operating system 120 instructions are stored, a data partition 118 in which data is stored, and a session integrity proxy module 116 partition in which instructions for carrying out session integrity proxy functionality are stored. The session integrity proxy module 116 partition may store program instructions and allow execution by the processor 122 of the program instructions to implement the functions of each respective node described herein, such as the web clients 104*a*, 104*b*, and 104*c* and the web servers 106*a*, 106*b*, and 106*c*. The data partition 118 may furthermore store data to be used during the execution of the program instructions.

The processor 122 may, for example, be an Intel® Pentium® type processor or another processor manufactured by, for example Motorola®, Compaq®, AMD®, or Sun Microsystems®. The processor 122 may furthermore execute the program instructions and process the data stored in the memory 114. In one embodiment, the instructions are stored in memory 114 in a compressed and/or encrypted format. As used herein the phrase, "executed by a processor" is intended to encompass instructions stored in a compressed and/or encrypted format, as well as instructions that may be compiled or installed by an installer before being executed by the processor.

The storage device 124 may, for example, be a magnetic disk (e.g., floppy disk and hard drive), optical disk (e.g., CD-ROM) or any other device or signal that can store digital information. The communication adaptor 130 permits communication between the session integrity proxy device 112 and other devices or nodes coupled to the communication adaptor 130 at the communication adaptor port 134. The communication adaptor 130 may be a network interface that transfers information from nodes on a network to the session integrity proxy device 112 or from the session integrity proxy device 112 to nodes on the network. The network may be a local or wide area network, such as, for example, the Internet, the World Wide Web, or the session integrity proxy system 100 illustrated in FIG. 1. It will be recognized that the session integrity proxy device 112 may alternately or in addition be coupled directly to one or more other devices through one or more input/output adaptors (not shown).

The session integrity proxy device 112 may also be coupled to an output device 126 such as, for example, a monitor or printer, and an input device 128 such as, for example, a keyboard or mouse. It will be recognized, however, that the session integrity proxy device 112 does not necessarily need to have an input device 128 or an output device 126 to operate. Moreover, the storage device 124 may also not be necessary for operation of the session integrity proxy device 112.

The elements 114, 122, 124, 126, 128, and 130 of the session integrity proxy device 112 may communicate by way of one or more communication busses 132. Those busses 132 may include, for example, a system bus, a peripheral component interface bus, and an industry standard architecture bus.

It should be recognized that the session integrity proxy session data storage and restoration functions may be performed by other than a separate session integrity proxy device 112. For example, session data storage and restoration may be performed at the web client 104 upon recognition of a failure at the web server 106. The session data storage and restoration function may also be implemented in a load balancer such that selection of primary and secondary web servers 106 may be performed by the same processor that performs the data storage and restoration function.

Regarding the storage of session data, the session integrity proxy 102 may save session data for the web client 104 in conjunction with an identifier. The identifier may identify, for example, that web client 104, or a particular session. Thus, for example with HTTP, a cookie identifier could be used to track all session data related to each unique web client 104.

The web client/session identifier may, moreover, be issued by various processors. For example, the session integrity proxy 102 may issue a web client/session identifier to each web client 104 communicating therewith. Alternately, the web server 106 could issue a web client/session identifier to each web client 104. Where web server 106 is issuing web client identifiers, those identifiers should be globally unique identifiers so that a web client identifier for a failed session could not conflict with a web client identifier for a session on the web server 106 to which the session fails over.

In another embodiment, session recovery through a session integrity proxy 102 may be combined with web request awareness. Web request awareness recognizes that certain web client 104 requests may be ignored while other requests should be recorded. For example, adding or deleting a product or service from a user's online shopping basket and the last web page viewed by the client might need to be recorded by the session integrity proxy 102 while web pages viewed previously might not need to be recorded in a certain embodiment. Therefore, a list of types of requests and/or responses to be recorded may be included in the session integrity proxy 102. In the web request awareness embodiment, all requests and/or responses matching at least one item on the list are recorded, while all requests and/or responses not matching at least one item on the list are ignored and not recorded. Moreover, in the event of a web client 104 failure, only the recorded requests and responses would be restored by the session integrity proxy 102 to recover the session.

In another embodiment, session recovery through a session integrity proxy 102 may be combined with transactional awareness. Transactional awareness recognizes that when a transaction has been completed it can be important that the transaction not be duplicated. Thus, for example, where a product or service is being purchased through a web client 104, the requests and/or responses leading up to completion of the transaction may be recorded. Once the transaction has been completed, however, it may be beneficial to remove the requests and/or responses leading up to completion of the transaction from the record in the session integrity proxy 102. In that way, a completed transaction will not be performed a second time when a web client 104 failure occurs and a session is replicated by the session integrity proxy 102.

An example of an embodiment of a session integrity proxy 102 utilizing transactional awareness, is a checkout process at a business to consumer web site. Such a web site may involve a sequence of web pages including: Page A—product confirmation, Page B—shipping address, Page C—credit card information, Page D—confirmation, and Page E—transaction number. Once the transaction number has been transmitted to the web client 104 the transaction is completed. Thus, if an error occurs at any point in the transaction prior to transmission of the transaction number, the requests from the web client 104 should be restored on another web server 106. If, however, an error occurs after transmission of the transaction number, then requests from the web client 104 leading to transmission of the transaction number should not be restored on another web server 106 during replication after a web server 106 failure. All requests leading to transmission of the transaction number may, therefore, be removed from storage in the session integrity proxy 102 once the transaction number has been transmitted to prevent duplication of the transaction.

In another embodiment, a web server 106 provides data to the session integrity proxy 102. That data includes session integrity recording information that is provided with responses to client requests. The session integrity recording information may be included in one or more fields of each response header for ease of access. The session integrity recording information may indicate, for example whether the response should be recorded by the session integrity proxy 102. The session integrity recording information may also or alternately indicate transaction start and stop information.

In one implementation in which a session integrity proxy 102 receives data from the web server 106, the web server 106 transmits a field to the session integrity proxy when a connection is established that defines whether data transmitted in the connection is to be recorded. If data transmitted in this connection or during the ensuing session or sessions is not to be recorded, then no data related to that connection will be recorded. If data transmitted in this connection or during the ensuing session or sessions is to be recorded, then some or all data related to that connection will be recorded by, for example, being stored in the storage device 124 of a session integrity proxy device 112.

In that embodiment, where data is to be recorded, a "Session integrity" field is included in each web server 106 response. When a session begins, the "SessionIntegrity" field includes a session integrity tag that states "TransactionStart" and has a transaction identification number. "TransactionStart" indicates that the web server 106 has interpreted a request received from the web client 104 as an indication that a session is beginning. The transaction identification number may be a globally unique identifier and may be used to track status of a session. For example, session communications may be stored in connection with the transaction identification number until a transaction is completed or aborted and all session communications may be deleted from storage once the session has been completed or aborted. Request and/or response data associated with the response that includes the "TransactionStart" tag in the "SessionIntegrity" field is also generally stored by the session integrity proxy 102.

Responses that occur after a session has begun may include "Record" with the transaction identification number assigned with the "TransactionStart" response, or "NoRecord." "Record" indicates that the associated request and/or response should be recorded by the session integrity proxy 102. For example, any request and/or response that might be necessary to restore a failed session would be recorded and include "Record" and the appropriate transaction identification number. "NoRecord" indicates that associated request and response information should not be recorded by the session integrity proxy 102. For example, any request and/or response that is not necessary to restore a session need not be recorded by the session integrity proxy 102. An example of a response that might not need to be recorded is access of an informational page related to a product being purchased or considered for purchase and the return to a previously accessed main page, where the actual purchase is initiated from that previous main page.

When a session is completed, the response that completes the session includes a session integrity tag that states "TransactionStop" with the transaction identification number assigned with the "TransactionStart" response. "TransactionStop" indicates that the web server 106 is responding with data that completes the session or that a previous request from the web client 104 indicates that a session has been completed or aborted. Upon receipt of the "TransactionStop" tag, the session integrity proxy 102 may delete all recorded data that is associated with the transaction identification number included with the "TransactionStop" tag. Thus, if a failure occurs after receipt of the "TransactionStop" tag, data leading to that transaction will not be restored and that completed transaction will not be repeated.

It should be recognized that transaction identification may be performed by assignment of other than a number and that the transaction may be identified by the web server 106, the web client 104, or the session integrity proxy 102. It should also be recognized that where, for example, the session is identified by a web client 104, not transaction identification number may be necessary.

In an embodiment, a method of restoring a session is provided. That method may be performed, for example, by the web client 104, the web server 106, or the session integrity proxy 102. The method includes storing a request sent from a client processor to a primary server processor, detecting an error at the primary server processor, transmitting the request sent from the client processor to the primary server processor to a secondary server processor, and transmitting a response sent from the secondary server processor to the client processor.

In an embodiment, the session integrity proxy includes an article of manufacture. The article of manufacture including a computer readable medium having stored thereon instructions which, when executed by a processor, cause the processor to store a request sent from a client processor to a primary server processor in the memory, detect an error at the primary server processor, transmit the request sent from the client processor to the primary server processor to a secondary server processor, and transmit a response sent from the secondary server processor to the client processor.

Figure 3:
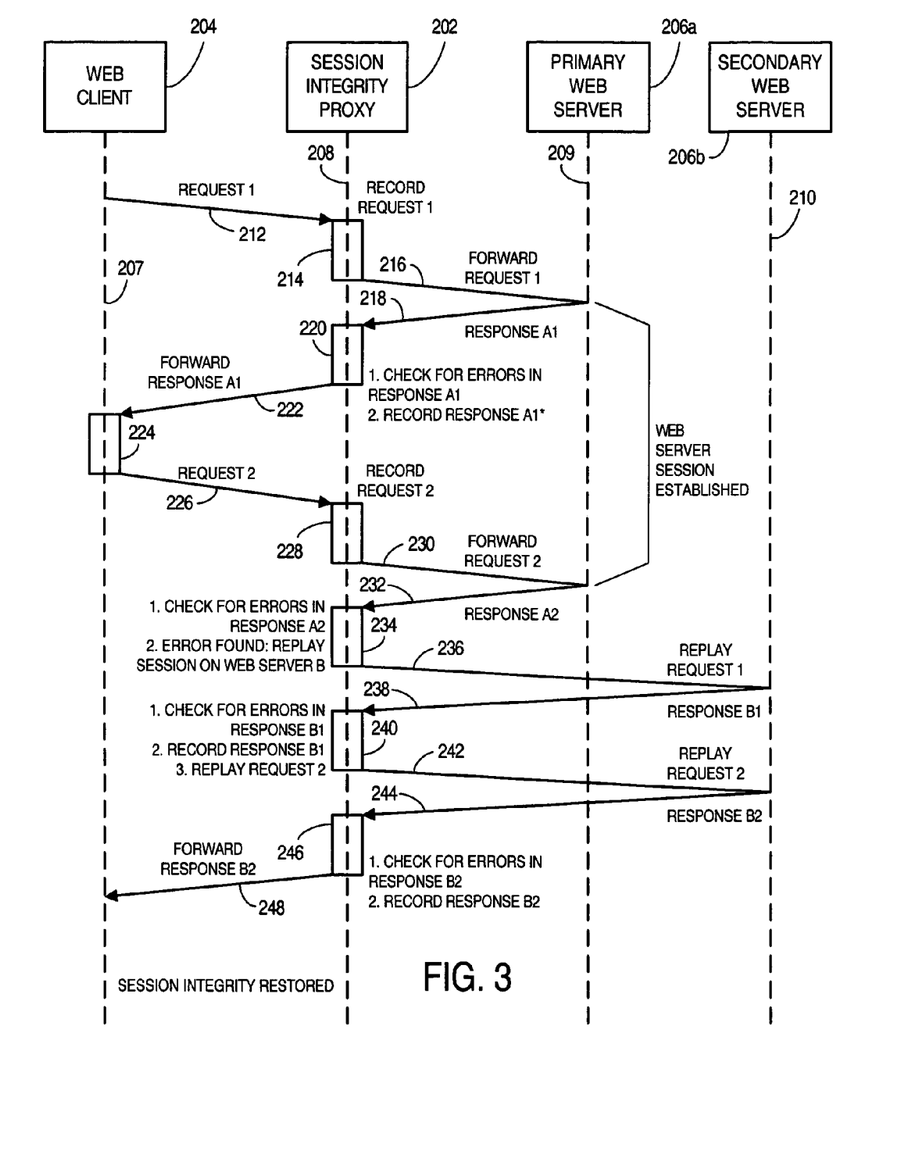
FIG. 3 is a timeline depicting communications between nodes in an embodiment of the invention.

FIG. 3 illustrates sample timelines depicting communications between a web client 204, a session integrity proxy 202, a primary web server 206a and a secondary web server 206b in an embodiment. In that embodiment, the session integrity proxy 202 receives communications from the web client 204 and transmits those web client communications to the appropriate web server 206a or 206b. Similarly, the session integrity proxy 202 receives communications from the appropriate web server 206a or 206b and transmits those web client communications to the web client 204.

Communications with the web client 204 are depicted by lines extending to or from a web client timeline 207. Communications with the session integrity proxy 202 are depicted by lines contacting a session integrity proxy timeline 208. Communications with the primary web server 206a are depicted by lines contacting a primary web server timeline 209. Communications with the secondary web server 206b are depicted by lines contacting a secondary web server timeline 210. Communications originating at the web client 204, the session integrity proxy 202, the primary web server 206a and the secondary web server 206b are indicated by lines with arrows extending away from the web client 204, the session integrity proxy 202, the primary web server 206a and the secondary web server 206b, respectively. Communications received at the web client 204, the session integrity proxy 202, the primary web server 206a and the secondary web server 206b are indicated by lines with arrows extending toward the web client 204, the session integrity proxy 202, the primary web server 206a and the secondary web server 206b, respectively.

At 212, the web client 204 initiates a session by transmitting a first request to the session integrity proxy 202. At 214, the first request is recorded by the session integrity proxy 202 so that, upon a failure of the session, the session may be restored by sending the first request to the secondary web server 206b. At 216, the session integrity proxy 202 forwards the first request to the primary web server 206a so that the primary web server 206a may act upon the request and respond thereto. The primary web server 206a and the secondary web server 206b may be selected by the session integrity proxy 202 acting as, for example, a load balancer, or the primary web server 206a may be selected by the web client 204 or a separate load balancer that is not illustrated. At 218, the primary web server 206a transmits a response to the first request to the session integrity proxy 202. At 220, upon receipt of the first response, the session integrity proxy 202 checks the first response for an error. An error is not detected in the first response and so the session integrity proxy 202 records information from that first response. At 222, the session integrity proxy 202 forwards the first response to the web client 204.

It should be noted that responses need not be recorded in all sessions. In other sessions, only portions of the response may be recorded and in yet other sessions entire responses may be recorded. For example, where the primary web server 206a is transmitting a "SessionIntegrity" field, the data in that field may be recorded. Alternately, where primary web server 206a specific information is being transmitted, a portion of or the entire response may be recorded to restore that primary web server 206a specific information in the case of failure of the session.

An error that might be detected may include, for example, primary web server 206a power failure, operating system error or failure, application error or failure, network cable failure, or network hardware failure. Certain errors, for example, are detected at the TCP/IP stack and result in a connection closed, unreachable error or another indication that the web server 106 is not responding or is unreachable. Application errors might result in, for example, transmission of an HTTP 404 or 500 error message.

At 224, the web client 204 makes a second request and at 226 the web client 204 transmits that second request to the session integrity proxy 202. At 228, the second request is recorded by the session integrity proxy 202. At 230, the session integrity proxy 202 forwards the second request to the primary web server 206a so that the primary web server 206b may act upon the request and respond thereto. At 232, the primary web server 206a transmits a response to the second request to the session integrity proxy 202. At 234, upon receipt of the second response, the session integrity proxy 202 checks the second response for an error. An error is detected in the second response and so the session integrity proxy 202 initiates a session restoration on the secondary web server 206b.

The session restoration is performed by the session integrity proxy 202 forwarding the requests in the session to the secondary web server 206b and relaying the response to the last request made by the web client 204 to the web client 204. Thus, the session integrity proxy 202 transmits the first request to the secondary web server 206b at 236. The secondary web server 206b might also be notified that it is being utilized for a session restoration. At 238, a response to the first request is transmitted from the secondary web server 206b to the session integrity proxy 202. At 240, the first response from the secondary web server 206b is checked for errors by the session integrity proxy 202. If an error is detected, the session integrity proxy may restore the session on yet another web server 206c and may continue to restore the session on other web servers 206 until the session is completed. At 240, however, no error is detected in the response received from the secondary web server 206b in response to the first request. At 240, the session integrity proxy 202 records the response received from the secondary web server 206b in response to the first request. The session integrity proxy 202 then transmits the second request received from the web client 204 to the secondary web server 206b at 242. At 244, the secondary web server 206b transmits a response to the second request to the session integrity proxy 202. The session integrity proxy 202 checks the second response received from the secondary web server 206b for errors and, in this example, finds no errors. The session integrity proxy 202 records the response received from the secondary web server 206b in response to the second request at 246 and then transmits that response to the web client 204 at 248.

In that way, the session integrity proxy 202 has enabled the web client 204 to receive the desired response without having to retransmit the first and second requests, even though the primary web server 206a failed in mid-session.

Thus, the present session integrity proxy provides a method and an apparatus for saving data passed from a web client to a web server during a session. The present session integrity proxy also provides a method and an apparatus for saving data passed from a web server to a web client during a session.

In addition, the present session integrity proxy provides a method and an apparatus for restoring a session upon failure of a web server. The present session integrity proxy also has the advantage that it may be implemented in a load balancer or a separate processor without modification of the web server or web client.

While the session integrity proxy has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A method, comprising:
receiving, at a session integrity proxy, a first request sent from a client device to a primary server device;
storing, by the session integrity proxy, information associated with the first request;
receiving a first response sent from the primary server device to the client device;
receiving a second request sent from the client device to the primary server device;
storing, by the session integrity proxy, information associated with the second request;
detecting an error associated with the primary server device; and
subsequent to said detecting, sending the stored information associated with the first request to a secondary server device.

2. The method of claim 1, further comprising:
receiving a new first response from the secondary server device;
sending the stored information associated with the second request to the secondary server device; and
receiving a second response sent from the secondary server device to the client device.

3. The method of claim 2, further comprising:
storing information associated with at least one of the first response, the new first response, or the second response.

4. The method of claim 1, further comprising:
determining if the first request will be sent to the secondary server device.

5. The method of claim 1, further comprising:
determining if the information associated with at least one of the first or second requests will be stored.

6. The method of claim 5, wherein the determination is based at least in part on a list of types of requests to be stored.

7. The method of claim 1, further comprising:
removing the information associated with the first and second requests from a storage device when a session between the client device and the primary server device is completed.

8. The method of claim 1, wherein the first and second requests comprise requests from a plurality of client devices.

9. The method of claim 8, wherein the first and second requests comprise requests to a plurality of primary server devices.

10. An apparatus, comprising:
a memory; and
a processor communicating with the memory, the memory containing instructions which, when executed by the processor, cause the processor to:
receive a first request sent from a client device to a primary server device remote from the client device;
store information associated with the first request;
receive a first response sent from the primary server device to the client device;
receive a second request sent from the client device to the primary server device;
store information associated with the second request;
detect an error associated with the primary server device; and
subsequent to said detecting, send the information associated with the first request to a secondary server device remote from the client device.

11. The apparatus of claim 10, wherein execution of the instructions further cause the processor to:
 receive a new first response from the secondary server device;
 send the stored information associated with the second request to the secondary server divice and
 receive a second response sent from the secondary server device to the client device.

12. The apparatus of claim 11, wherein execution of the instructions further cause the processor to:
 store information associated with at least one of the first response, the new first response, or the second response.

13. The apparatus of claim 10, wherein execution of the instructions further cause the processor to:
 determine if the information associated with at least one of the first or second requests will be stored.

14. The apparatus of claim 13, wherein the determination is based at least in part on a list of types of requests to be stored.

15. The apparatus of claim 10, wherein execution of the instructions further cause the processor to:
 remove the information associated with at least one of the first or second requests from a storage device when a session between the client device and the primary server device is completed.

16. The apparatus of claim 10, wherein the first and second requests comprise requests from a plurality of client devices.

17. The apparatus of claim 10, wherein the first and second requests comprise requests to a plurality of primary server divices.

18. An article of manufacture comprising:
 a computer readable medium having stored thereon instructions which, when executed by a processor, cause the processor to:
  receive a first request sent from a client device to a primary server device remote from the client device;
  store information associated with the first request;
  receive a first response sent from the primary server device to the client device;
  receive a second request sent from the client device to the primary server device;
  store information associated with the second request;
  detect an error associated with the primary server device; and
  subsequent to said detecting, send the stored information associated with the first request to a secondary server device remote from the client device.

19. The article of claim 18, wherein execution of the instructions further cause the processor to:
 receive a new first response from the secondary server device;
 send the stored information associated with the second request to the secondary server device; and
 receive a second response sent from the secondary server device to the client device.

20. The article of claim 19, wherein execution of the instructions further cause the processor to:
 store information associated with at least one of the first response, the new first response, or the second response.

21. The article of claim 18, wherein execution of the instructions further cause the processor to:
 determine if the information associated with at least one of the first and second requests will be stored.

22. The article of claim 21, wherein the determination is based at least in part on a list of types of requests to be stored.

23. The article of claim 18, wherein execution of the instructions further cause the processor to:
 remove the information associated with the first and second requests from a storage device when a session between the client device and the primary server device is completed.

24. The article of claim 18, wherein the first and second requests comprise requests from a plurality of client devices.

25. The article of claim 18, wherein the first and second requests comprise requests to a plurality of primary server devices.

26. A system, comprising:
 a memory;
 a processor communicating with the memory, the memory containing instructions which, when executed by the processor, cause the processor to:
  receive a first request sent from a Web client to a primary Web server;
  store information associated with the first request;
  receive a first response sent from the primary Web server to the Web client;
  receive a second request sent from the Web client to the primary Web server;
  store information associated with the second request;
  detect an error associated with the primary Web server; and
  subsequent to said detecting, send the information associated with the first request to a secondary Web server; and
 a communication port adapted to communicate via the Internet.

27. The system of claim 26, wherein the first and second requests comprise information associated with a plurality of requests sent from the Web client to the primary Web server.

28. The system of claim 27, wherein the information associated with the plurality of request is sent to the secondary Web server.

* * * * *